US008495034B2

(12) United States Patent
Hodgens et al.

(10) Patent No.: US 8,495,034 B2
(45) Date of Patent: Jul. 23, 2013

(54) NUMERIC, DECIMAL AND DATE FIELD COMPRESSION

(75) Inventors: Mark A. Hodgens, San Diego, CA (US); Fred S. Kaufmann, Irvine, CA (US); Donald R. Pederson, San Diego, CA (US); Gary A. Roberts, Carlsbad, CA (US)

(73) Assignee: Teradata US, Inc., Dayton, OH (US)

( * ) Notice: Subject to any disclaimer, the term of this patent is extended or adjusted under 35 U.S.C. 154(b) by 95 days.

(21) Appl. No.: 13/013,651

(22) Filed: Jan. 25, 2011

(65) Prior Publication Data

US 2012/0173496 A1    Jul. 5, 2012

Related U.S. Application Data

(60) Provisional application No. 61/428,299, filed on Dec. 30, 2010.

(51) Int. Cl.
*G06F 17/30* (2006.01)

(52) U.S. Cl.
USPC ........................................................ 707/693

(58) Field of Classification Search
USPC ........................................................ 707/693
See application file for complete search history.

(56) References Cited

U.S. PATENT DOCUMENTS

| 4,506,325 | A | * | 3/1985 | Bennett et al. ................... 341/65 |
| 5,883,975 | A | * | 3/1999 | Narita et al. ................... 382/232 |
| 5,918,225 | A | * | 6/1999 | White et al. ........................... 1/1 |
| 6,121,904 | A | * | 9/2000 | Levine .............................. 341/65 |
| 6,285,796 | B1 | * | 9/2001 | Acharya et al. ............... 382/246 |
| 6,577,769 | B1 | * | 6/2003 | Kenyon et al. ................ 382/239 |
| 6,696,992 | B1 | * | 2/2004 | Chu ................................. 341/67 |
| 7,068,192 | B1 | * | 6/2006 | Dean et al. ...................... 341/67 |
| 7,827,187 | B2 | * | 11/2010 | Raman et al. ................. 707/750 |
| 2008/0071748 | A1 | * | 3/2008 | Wroblewski et al. ............. 707/3 |
| 2008/0071818 | A1 | * | 3/2008 | Apanowicz et al. .......... 707/101 |
| 2008/0222136 | A1 | * | 9/2008 | Yates et al. ......................... 707/5 |
| 2009/0055728 | A1 | * | 2/2009 | Waldvogel et al. ........... 715/237 |
| 2009/0190843 | A1 | * | 7/2009 | Jung et al. ..................... 382/233 |
| 2009/0254521 | A1 | * | 10/2009 | Raman et al. ..................... 707/3 |
| 2010/0312755 | A1 | * | 12/2010 | Hildebrandt et al. ......... 707/693 |

\* cited by examiner

*Primary Examiner* — Cam-Linh Nguyen

(74) *Attorney, Agent, or Firm* — Gates & Cooper LLP; Randy L. Campbell, Jr.

(57) ABSTRACT

A method, apparatus, and article of manufacture for accessing data in a computer system. Compression and decompression functions are associated with a column of the table, in order to perform compression of decimal, numeric or date data stored in the column when the data is inserted or updated in the table, and in order to perform decompression of the data stored in the column when the data is retrieved from the table. The compression function compresses and stores the data in a fixed-length compressed field in the column without a length value, and the fixed-length compressed field has a size that is determined by a range of values for the data stored in the fixed-length compressed field. The decompression function retrieves and decompresses the data from the fixed-length compressed field.

27 Claims, 3 Drawing Sheets

NUMERIC, DECIMAL AND DATE FIELD COMPRESSION

CROSS REFERENCE TO RELATED APPLICATION

This application claims the benefit under 35 U.S.C. Section 119(e) of and commonly-assigned U.S. Provisional Patent Application Ser. No. 61/428,299, filed on Dec. 30, 2010, by Mark A. Hodgens, Fred S. Kaufmann, Donald R. Pederson, and Gary A. Roberts, entitled "NUMERIC, DECIMAL AND DATE FIELD COMPRESSION," which application is incorporated by reference herein.

BACKGROUND OF THE INVENTION

1. Field of the Invention

This invention relates in general to database management systems performed by computers, and in particular, to numeric, decimal and date field compression in database systems.

2. Description of Related Art

The ability to manage massive amounts of information has become a necessity for business today. With the advent of data warehouses, it is not uncommon for databases to store very large tables that comprise gigabytes, terabytes, petabytes or more, because businesses are retaining enormous amounts of data and then mining it to identify business value. Regulatory and legal retention requirements are also leading businesses to keep years of historical data accessible to data warehouses.

Compression is used to reduce storage cost by storing more logical data per unit of physical capacity. Performance may be improved as well, because there is less physical data to retrieve from data storage devices. Performance may be further enhanced since data can remain compressed while cached in memory. Consequently, there are many benefits to the use of compression in data warehouses.

A problem arises, however, in that most data warehouses offer only a few types of compression. Generally, different types of data require different types of compression for optimal performance. Consequently, most data types are not optimally compressed in most data warehouses.

Consider, for example, the following SQL statement which defines a decimal column in a table using the CREATE TABLE command:

CREATE TABLE tab1 (col1 DECIMAL (p,s))

In this example, "tab1" is the table name, and "col1" is a first column of the table having a numeric data type as indicated by the DECIMAL mnemonic (or alternatively, the DEC or NUMERIC mnemonics) with a fixed precision p and a scale s.

The precision p is the maximum total number of decimal digits that can be stored, both to the left and to the right of the decimal point, wherein, in one embodiment, the precision has a value from 1 through a maximum precision of 18 and a default of 5 (although other embodiments may have different values). The scale s is the maximum number of decimal digits that can be stored to the right of the decimal point, wherein the scale must be a value from 0 through p, the scale can be specified only if the precision p is specified, and the default scale is 0; therefore, $0<=s<=p$.

The amount of storage required for this data type varies, based on the precision. In one embodiment, decimal values are scaled by the power of ten equal to the number of fractional digits. The scaled decimal value is stored as a two's complement binary number in one, two, four, or eight bytes. The number of bytes used for the scaled decimal value depends on the total number of digits defined for the column.

Specifically, depending on the precision of the column (e.g., 1 to 18), storage of a decimal value requires between 1 and 8 bytes. The following table shows the number of bytes used to store decimal values.

TABLE 1

| Number of Defined Digits | Number of Bytes |
|---|---|
| 1 to 2 | 1 |
| 3 to 4 | 2 |
| 5 to 9 | 4 |
| 10 to 18 | 8 |

However, the same amount of storage is used, based on the column definition, regardless of the actual data values stored in the column. Specifically, every row in the table consumes the same number of bytes for the column, even if the value in the row could be stored in a smaller number of bytes. Consequently, significant compression can be performed on the actual data values.

In the prior art, a number of solutions have been presented for the compression of such data. For example, the VARDECIMAL data type is available, wherein the VARDECIMAL columns of each row consume only the space that is required to contain the data, plus 2 bytes of overhead to store an offset to the data. In another example, a length field may precede the compressed data, which is stored in a variable length field.

In yet another example, a multi-value compression may be performed, where the compressed value is explicitly defined in the column definition. This requires specifying each value in the compression specification and each value takes one bit in every data row.

Some database vendors offer solutions based on specific values across many rows in the table. However, this type of solution would not work well for situations where the rows in the table have different values, like birthdays or sales price.

Notwithstanding these various solutions, there remains a need in the art for improved data compression functions. Specifically, there remains a need for improved compression of short fields, such as decimals, numerics, and dates. The present invention satisfies this need.

SUMMARY OF THE INVENTION

To overcome the limitations in the prior art described above, and to overcome other limitations that will become apparent upon reading and understanding the present specification, the present invention discloses a computer-implemented method, apparatus, and article of manufacture for accessing data in a computer system.

Compression and decompression functions are associated with a column of the table, in order to perform compression of decimal, numeric or date data stored in the column when the data is inserted or updated in the table, and in order to perform decompression of the data stored in the column when the data is retrieved from the table.

The compression function compresses and stores the data in a fixed-length compressed field in the column without a length value, wherein the fixed-length compressed field has a size that is determined by a range of values for the data stored in the fixed-length compressed field. The decompression function retrieves and decompresses the data from the fixed-length compressed field.

The range of values for the data stored in the fixed-length compressed field is specified in one or more statements used to create or alter the table, and comprises a range from a minimum compressed value to a maximum compressed value. The size of the fixed-length compressed field is determined by how many bytes are required to represent the range of values for the data stored in the fixed-length compressed field. The data within the range of values is stored in a compressed format and the data outside the range of values is stored in an uncompressed format.

The range of values for the data stored in the fixed-length compressed field is stored in the column definition for the table metadata. Specifically, a marker or flag is stored in the column definition of the table metadata and indicates that the data in the column is compressed. The marker or flag indicates how many different ranges of values are defined for the column. When there are multiple different ranges of values defined for the column, each of the multiple different ranges of values has an associated fixed-length compressed field in the column without a length value, and each fixed-length compressed field has a different size.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Environment

Figure 1:
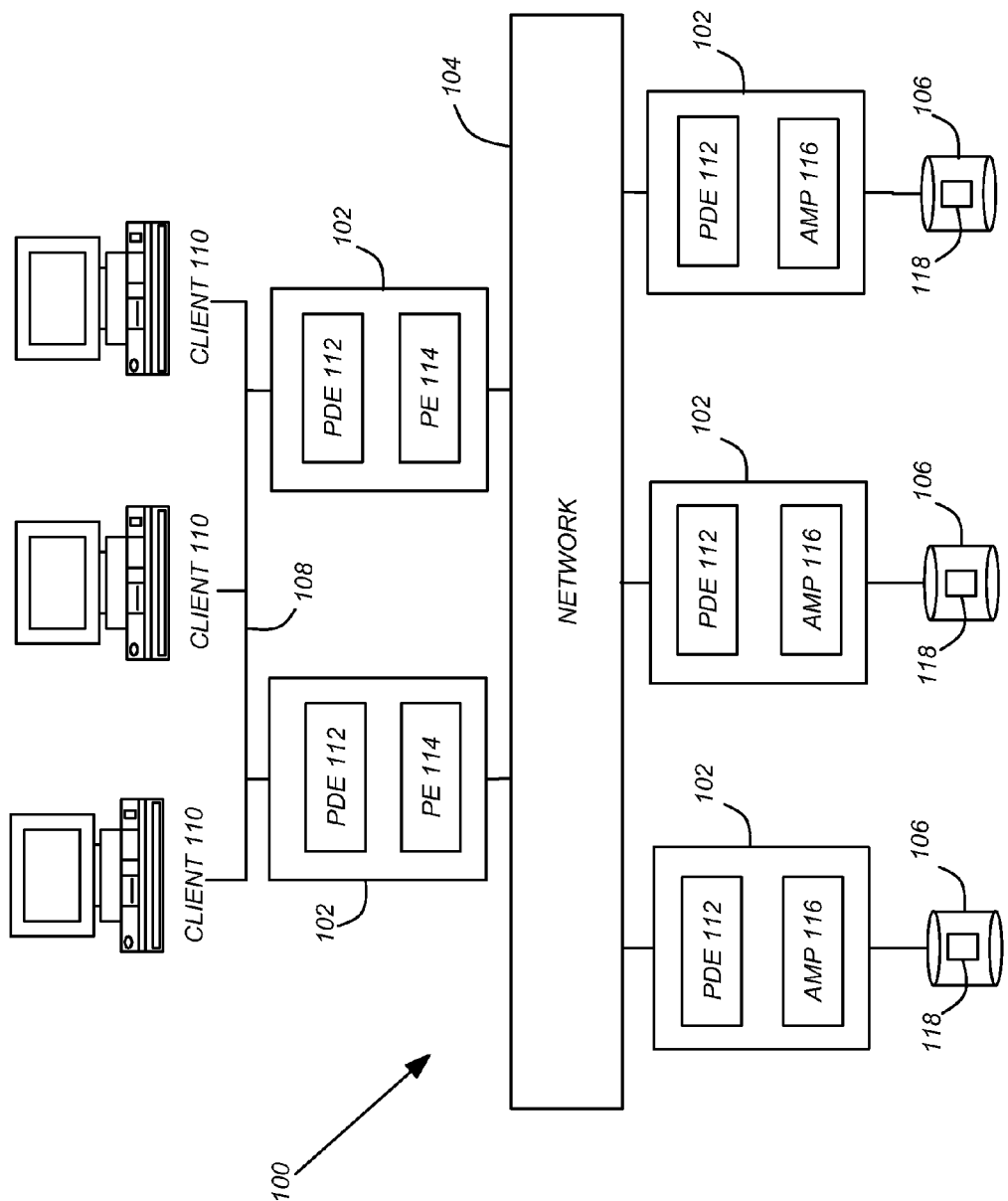
FIG. 1 illustrates an exemplary software and hardware environment that could be used with the present invention.

FIG. 1 illustrates an exemplary hardware and software environment that could be used with the present invention. In the exemplary environment, a computer system 100 is comprised of one or more processing units (PUs) 102, also known as processors or nodes, which are interconnected by a network 104. Each of the PUs 102 is coupled to zero or more fixed and/or removable data storage units (DSUs) 106, such as disk drives, that store one or more relational databases. Further, each of the PUs 102 is coupled to zero or more data communications units (DCUs) 108, such as network interfaces, that communicate with one or more remote systems or devices.

Operators of the computer system 100 typically use a workstation 110, terminal, computer, or other input device to interact with the computer system 100. This interaction generally comprises requests or statements that conform to the Structured Query Language (SQL) standard, and invoke functions performed by Relational DataBase Management System (RDBMS) software executed by the system 100.

Specifically, the RDBMS software manages data stored as one or more tables in a relational database, wherein a table is two dimensional, comprising rows (tuples) and columns (attributes). Generally, each column is defined by a table schema or metadata that defines the type of data held in that column. SQL statements may be used to interact with and manipulate the data stored in the tables, including inserting or updating the data and retrieving the data.

In the preferred embodiment of the present invention, the RDBMS software comprises the Teradata® product offered by Teradata Corporation, and includes one or more Parallel Database Extensions (PDEs) 112, Parsing Engines (PEs) 114, and Access Module Processors (AMPs) 116. These components of the RDBMS software perform the functions necessary to implement the RDBMS and SQL, i.e., definition, compilation, interpretation, optimization, database access control, database retrieval, database update, etc.

Work is divided among the PUs 102 in the system 100 by spreading the storage of a partitioned relational database 118 managed by the RDBMS software across multiple AMPs 116 and the DSUs 106 (which are managed by the AMPs 116). Thus, a DSU 106 may store only a subset of rows that comprise a table in the partitioned database 118 and work is managed by the system 100 so that the task of operating on each subset of rows is performed by the AMP 116 managing the DSUs 106 that store the subset of rows.

The PEs 114 handle communications, session control, optimization and query plan generation and control. The PEs 114 fully parallelize all functions among the AMPs 116. As a result, the system of FIG. 1 applies a multiple instruction stream, multiple data stream (MIMD) concurrent processing architecture to implement a relational database management system 100.

Generally, the PDEs 112, PEs 114, and AMPs 116 are tangibly embodied in and/or accessible from a device, media, carrier, etc., such as RAM, ROM, one or more of the DSUs 106, and/or a remote system or device communicating with the computer system 100 via one or more of the DCUs 108. The PDEs 112, PEs 114, and AMPs 116 each comprise instructions and/or data which, when executed, invoked, and/or interpreted by the PUs 102 of the computer system 100, cause the necessary steps or elements of the present invention to be performed.

Those skilled in the art will recognize that the exemplary environment illustrated in FIG. 1 is not intended to limit the present invention. Indeed, those skilled in the art will recognize that other alternative environments may be used without departing from the scope of the present invention. In addition, it should be understood that the present invention may also apply to components other than those disclosed herein.

Execution of SQL Statements

Figure 2:
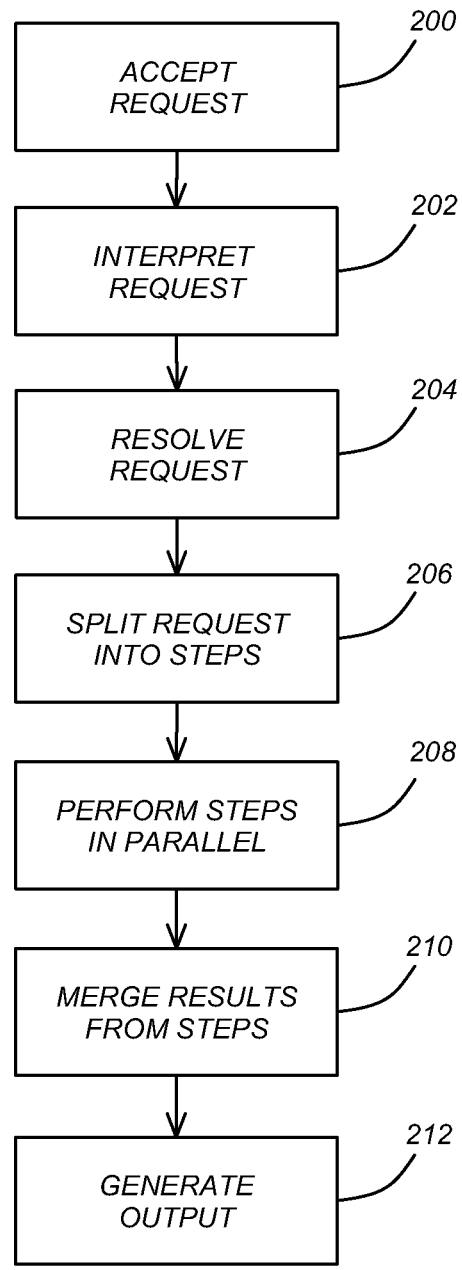
FIG. 2 is a flow chart illustrating the steps necessary for the interpretation and execution of queries or other user interactions, either in a batch environment or in an interactive environment, according to the preferred embodiment of the present invention.

FIG. 2 is a flow chart illustrating the steps performed by the system 100 for the interpretation and execution of user requests or other interactions, either in a batch environment or in an interactive environment, according to the preferred embodiment of the present invention.

Block 200 represents a request comprising one or more SQL statements being accepted by the PE 114.

Block 202 represents the request being transformed by an interpreter function of the PE 114.

Block 204 represents the PE 114 resolving symbolic names in the request using a data dictionary that contains information about the relational database 118, including the tables and columns in the relational database 118.

Block 206 represents the PE 114 splitting the request into one or more "step messages", wherein each step message is assigned to an AMP 116 that manages the desired rows. As noted above, the rows of the tables in the database 118 may be partitioned or otherwise distributed among multiple AMPs 116, so that multiple AMPs 116 can work at the same time on the data of a given table. If a request is for data in a single row, the PE 114 transmits the steps to the AMP 116 in which the data resides. If the request is for multiple rows, then the steps are forwarded to all participating AMPs 116. Since the tables in the database 118 may be partitioned or distributed across the DSUs 16 of the AMPs 116, the workload of performing the request can be balanced among AMPs 116 and DSUs 16.

Block 206 also represents the PE 114 sending the step messages to their assigned AMPs 116.

Block 208 represents the AMPs 116 performing the required data manipulation associated with the step messages received from the PE 114, and then transmitting appropriate responses back to the PE 114.

Block 210 represents the PE 114 then merging the responses that come from the AMPs 116.

Note that the compression and/decompression as described herein may be performed at steps 208 and/or 210. Block 212 represents the output or result table being generated.

Decimal, Numeric and Date Field Compression

As noted above, in the prior art, the compression of decimals, numerics, and dates is inefficient and is often not performed, because the necessary control bytes represent a significant overhead. Consider that, if a four-byte value is compressed to one or two bytes, with another one byte indicating the length or offset of the compressed data, then the one byte length or offset equals 50% or 100% of the size of the compressed data itself.

The present invention solve this problem by using a fixed-length compressed field, so that a length byte is not necessary. The size of the fixed-length compressed field is determined by how many bytes are required to represent the range of values for the data stored in the fixed-length compressed field.

Decimal and Numeric Compression

In one embodiment, the present invention provides for compression and decompression of decimal or numeric fields.

For example, the following SQL statement illustrates how a decimal or numeric field compression and decompression is associated with a particular column in a table using the CREATE TABLE command:

```
CREATE TABLE tab1 ( col1 DECIMAL (p,s)
    COMPRESS
    RANGE <minimum compressed value>
        TO <maximum compressed value>
    [RANGE <minimum compressed value>
        TO <maximum compressed value> ... ] )
```

In this example, "tab1" is the table name, and "col1" is a first column of the table having a decimal data type as indicated by the DECIMAL mnemonic (or alternatively the DEC or NUMERIC mnemonics) with a fixed precision p and a scale s.

As noted above, the precision p is the maximum total number of decimal digits that can be stored, both to the left and to the right of the decimal point, wherein, in one embodiment, the precision has a value from 1 through a maximum precision of 18 and a default of 5 (although other embodiments may have different values). The scale s is the maximum number of decimal digits that can be stored to the right of the decimal point, wherein the scale must be a value from 0 through p, the scale can be specified only if the precision is specified, and the default scale is 0; therefore, $0<=s<=p$. Note that maximum storage sizes vary, based on the precision, as shown in Table 1 above.

The mnemonic COMPRESS indicates that decimal field compression and decompression is being performed. The mnemonics RANGE and TO indicate a range of values for compression from a <minimum compressed value> to a <maximum compressed value>.

The compression function compresses and stores the data in a fixed-length compressed field in the column without a length value, wherein the fixed-length compressed field has a size that is determined by the range of values. The size of the fixed-length compressed field is determined by how many bytes are required to represent the range of values. The data within the range of values is stored in a compressed format and the data outside all of the ranges is stored in an uncompressed format.

The range of values is defined in the column definition for the table metadata. Specifically, a marker or flag is stored in the column definition of the table metadata and indicates that the data in the column is compressed. The marker or flag indicates how many different ranges of values are defined for the column. When there are multiple different ranges of values defined for the column, each of the multiple different ranges of values has an associated fixed-length compressed field in the column without a length value, and each fixed-length compressed field has a different size.

Consider the following example, wherein sales price data is stored in a DECIMAL(9,2) column designated as SalesPrice. In the prior art, a DECIMAL(9,2) column requires 4 bytes of storage, as indicated in Table 1 above, regardless of the value of the data stored in the column.

However, in the present invention, two bytes can be used to represent 65536 values. Suppose the majority of sales prices are low, but more than $1.00. Thus, the compression range can be defined as:

SalesPrice DECIMAL(9,2) COMPRESS RANGE 1.00 TO 656.35

In the present invention, a SalesPrice value between $1.00 and $656.35 is stored in 2 bytes of storage, while a SalesPrice value outside the defined range is stored in 4 bytes of storage.

Thus, the RDBMS software recognizes that a column stores compressed data by the presence of the marker or flag in the column definition of the table metadata, and the RDBMS software determines whether the data in the column is either compressed or uncompressed, and the range of values for the compressed data, by the amount of storage used for the data. As a result, no length need be stored with the data.

Consider that, if 90% of the SalesPrice values fall within the range, then this decimal field compression provides a space savings of 45%:

$1-(0.90*2 \text{ bytes}+0.10*4 \text{ bytes})/4 \text{ bytes}=45\%$

As noted above, multiple compression ranges can be used in the present invention. Consider another example where the SalesPrice column is defined with multiple compression ranges:

SalesPrice DECIMAL(18,2) COMPRESS RANGE 0.01 TO 2.56
RANGE 2.57 TO 657.92
RANGE 657.93 TO 4294967952.93

In this example, there may be 256 SalesPrice values between 0.01 and 2.56, which require only 1 byte of storage. There may be 65,536 SalesPrice values between 2.57 and 657.92, which require 2 bytes of storage. SalesPrice values between 657.93 and 4294967952.93 would require 4 bytes of storage. Non-compressed values outside these three ranges would require 8 bytes of storage, as indicated in Table 1.

Date Compression

In another embodiment, the present invention provides a fixed-length compressed date field, so that a length need not be stored. Again, the size of the compressed date field is determined by the number of bytes required to represent the range of values in the compression specification.

For example, suppose a column storing birth dates was defined as:

Birthday DATE COMPRESS RANGE '01/01/1900' TO '12/31/2027'

The day portion of DATE requires 5 bits to represent days 1 through 31. The month portion of DATE requires 4 bits to represent months January through December. The year portion of DATE requires 7 bits to represent years 1900 through 2027. Thus, a total of 16 bits is required. If 100% of the birthdays fall between Jan. 1, 1900 and Dec. 31, 2027, then this compression provides a space savings of 50%.

Flowchart

Figure 3:
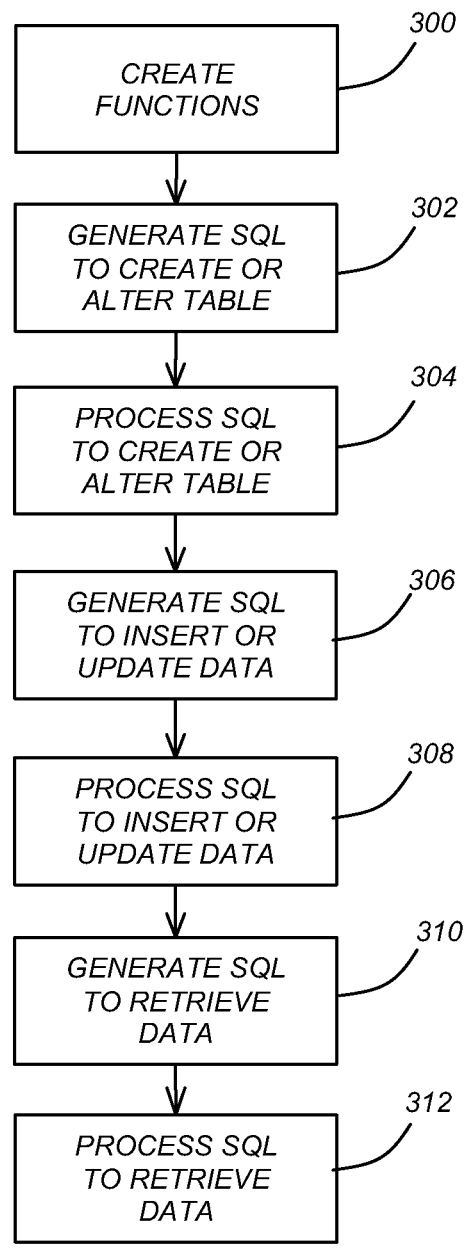
FIG. 3 is a flow chart illustrating the steps performed when using the numeric field compression technique of the present invention.

FIG. 3 is a flow chart illustrating the steps performed by the system 100 when using the numeric field compression technique, according to the preferred embodiment of the present invention.

Block 300 represents one or more functions being created within the RDBMS software implementing the desired compression and decompression algorithms. These functions are then associated with one or more columns of a table when the table is created or altered, in order to perform the desired compression or decompression of data stored in the associated columns. The data is compressed by the function implementing the desired compression algorithm when the data is inserted or updated in the table, and the data is decompressed by the function implementing the desired decompression algorithm when the data is retrieved from the table.

The compression function compresses and stores the data in a fixed-length compressed field in a column without a length value, wherein the fixed-length compressed field has a size that is determined by a range of values for the data stored in the fixed-length compressed field. The decompression function retrieves and decompresses the data from the fixed-length compressed field.

The range of values for the data stored in the fixed-length compressed field is specified in one or more statements used to create or alter the table, and comprises a range from a minimum compressed value to a maximum compressed value. The size of the fixed-length compressed field is determined by how many bytes are required to represent the range of values for the data stored in the fixed-length compressed field. The data within the range of values is stored in a compressed format and the data outside the range of values is stored in an uncompressed format.

The range of values for the data stored in the fixed-length compressed field is defined in the column definition for the table metadata. Specifically, a marker or flag is stored in the column definition of the table metadata and indicates that the data in the column is compressed. The marker or flag indicates how many different ranges of values are defined for the column. When there are multiple different ranges of values defined for the column, each of the multiple different ranges of values has an associated fixed-length compressed field in the column without a length value, and each fixed-length compressed field has a different size.

Block 302 represents one or more SQL statements being generated that include CREATE TABLE or ALTER TABLE commands for a table. The functions implementing the desired compression or decompression algorithms are identified in the statements for one or more columns of the table (for example, as indicated by the COMPRESS mnemonic).

Block 304 represents the RDBMS processing the SQL statements of Block 302, and creating or altering one or more tables stored in the relational database 118 managed by the RDBMS software. As noted above, one or more functions implementing a desired compression or decompression algorithm are associated with one or more columns of the table, in order to perform compression or decompression of data stored in the associated columns when the data is inserted or updated in the table or retrieved from the table.

Block 306 represents one or more SQL statements being generated that include commands to insert or update data in a table.

Block 308 represents the RDBMS software processing the SQL statements of Block 306, and inserting or updating data stored in one or more columns of a table stored in the relational database 118 managed by the RDBMS software. As noted above, the functions implementing a desired compression or decompression algorithm are associated with the columns of the table, in order to perform compression of the data stored in the associated columns, such that the data is compressed by the function implementing the desired compression algorithm when the data is inserted or updated in the table. Specifically, the function implementing the desired compression algorithm is invoked when the statements are processed, resulting in the data being compressed by the function before it is inserted or updated in the table.

Block 310 represents one or more SQL statements being generated that include commands to retrieve data from a table.

Block 312 represents the RDBMS software processing the SQL statements of Block 310, and retrieving data stored in one or more columns of a table stored in the relational database 118 managed by the RDBMS. As noted above, the functions implementing a desired compression and decompression algorithm are associated with the columns of the table, in order to perform decompression of the data stored in the associated columns, such that the data is decompressed by the function implementing the desired decompression algorithm when the data is retrieved from the table. Specifically, the function implementing the desired decompression algorithm is invoked when the statements are processed, resulting in the data being decompressed by the function after it is retrieved from the table and before it is presented to a user or otherwise processed.

CONCLUSION

This concludes the description of the preferred embodiment of the invention.

It can be seen that there are a number of advantages to the present invention. For example, the present invention provides fairly good compression rates for decimal, numeric and date values. In addition, the present invention implements a simple algorithm to compress and decompress the data. The present invention is preferable over other techniques because there is no length field to indicate how large the compressed data is, is easily specified in the column definition of the table metadata and thus is easily understood, and it provides substantial and predictable space savings.

There are alternative embodiments for accomplishing the same invention. For example, any type of computer, such as a mainframe, minicomputer, or personal computer, could be used to implement the present invention. In addition, any DBMS or other program that performs similar functions could be used with the present invention.

Finally, it is noted that the foregoing description of the various embodiments for implementing the invention have been presented for the purposes of illustration and description. They are not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for accessing data in a computer system, comprising:
    accessing data stored in a table in a database managed by a database management system executed by the computer system;
    wherein compression and decompression functions are associated with a column of the table, in order to perform compression of the data stored in the column when the data is inserted or updated in the table, and in order to perform decompression of the data stored in the column when the data is retrieved from the table;
    wherein the compression function stores the data in a fixed-length compressed field in the column without a length value, and the fixed-length compressed field has a size that is determined by a range of values for the data stored in the fixed-length compressed field; and
    wherein the decompression function retrieves and decompresses the data from the fixed-length compressed field.

2. The method of claim 1, wherein the database management system creates or alters the table storing the data in the database.

3. The method of claim 1, wherein the database management system inserts, updates or retrieves the data stored in the table stored in the database.

4. The method of claim 1, wherein the size of the fixed-length compressed field is determined by how many bytes are required to represent the range of values for the data stored in the fixed-length compressed field.

5. The method of claim 1, wherein the range of values for the data stored in the fixed-length compressed field is specified in one or more statements used to create or alter the table.

6. The method of claim 1, wherein the range of values for the data stored in the fixed-length compressed field comprises a range from a minimum compressed value to a maximum compressed value.

7. The method of claim 1, wherein the data within the range of values is stored in a compressed format and the data outside the range of values is stored in an uncompressed format.

8. The method of claim 1, wherein the range of values for the data stored in the fixed-length compressed field is defined in metadata for the table.

9. The method of claim 1, wherein a marker or flag is stored in the metadata indicates that the data in the column is compressed.

10. The method of claim 9, wherein the marker or flag indicates how many different ranges of values are defined for the column.

11. The method of claim 1, wherein there are multiple different ranges of values defined for the column, each of the multiple different ranges of values has an associated fixed-length compressed field in the column without a length value, and each fixed-length compressed field has a different size.

12. The method of claim 1, wherein the data is decimal or numeric data.

13. The method of claim 1, wherein the data is date data.

14. An apparatus for accessing data, comprising:
    a database management system, executed by a computer system, for accessing data stored in a table in a database managed by the database management system;
    wherein compression and decompression functions are associated with a column of the table, in order to perform compression of the data stored in the column when the data is inserted or updated in the table, and in order to perform decompression of the data stored in the column when the data is retrieved from the table;
    wherein the compression function stores the data in a fixed-length compressed field in the column without a length value, and the fixed-length compressed field has a size that is determined by a range of values for the data stored in the fixed-length compressed field; and
    wherein the decompression function retrieves and decompresses the data from the fixed-length compressed field.

15. The apparatus of claim 14, wherein the database management system creates or alters the table storing the data in the database.

16. The apparatus of claim 14, wherein the database management system inserts, updates or retrieves the data stored in the table stored in the database.

17. The apparatus of claim 14, wherein the size of the fixed-length compressed field is determined by how many bytes are required to represent the range of values for the data stored in the fixed-length compressed field.

18. The apparatus of claim 14, wherein the range of values for the data stored in the fixed-length compressed field is specified in one or more statements used to create or alter the table.

19. The apparatus of claim 14, wherein the range of values for the data stored in the fixed-length compressed field comprises a range from a minimum compressed value to a maximum compressed value.

20. The apparatus of claim 14, wherein the data within the range of values is stored in a compressed format and the data outside the range of values is stored in an uncompressed format.

21. The apparatus of claim 14, wherein the range of values for the data stored in the fixed-length compressed field is defined in metadata for the table.

22. The apparatus of claim 14, wherein a marker or flag is stored in the metadata indicates that the data in the column is compressed.

23. The apparatus of claim 22, wherein the marker or flag indicates how many different ranges of values are defined for the column.

24. The apparatus of claim 14, wherein there are multiple different ranges of values defined for the column, each of the multiple different ranges of values has an associated fixed-length compressed field in the column without a length value, and each fixed-length compressed field has a different size.

25. The apparatus of claim 14, wherein the data is decimal or numeric data.

26. The apparatus of claim 14, wherein the data is date data.

27. An article of manufacture comprising a program storage device embodying one or more instructions that, when executed by a computer system, perform a method for accessing data, the method comprising:

accessing data stored in a table in a database managed by a database management system executed by the computer system;

wherein compression and decompression functions are associated with a column of the table, in order to perform compression of the data stored in the column when the data is inserted or updated in the table, and in order to perform decompression of the data stored in the column when the data is retrieved from the table;

wherein the compression function stores the data in a fixed-length compressed field in the column without a length value, and the fixed-length compressed field has a size that is determined by a range of values for the data stored in the fixed-length compressed field; and wherein the decompression function retrieves and decompresses the data from the fixed-length compressed field.

* * * * *